United States Patent [19]

Cunningham

[11] Patent Number: 4,547,018
[45] Date of Patent: Oct. 15, 1985

[54] CLAMPING MEANS FOR A STRAP

[75] Inventor: Douglas J. Cunningham, Lutterworth, England

[73] Assignee: Britax (Wingard) Limited, United Kingdom

[21] Appl. No.: 671,577

[22] Filed: Nov. 15, 1984

[30] Foreign Application Priority Data

Nov. 30, 1983 [GB] United Kingdom ............... 8331980
Dec. 15, 1983 [GB] United Kingdom ............... 8333476
Mar. 2, 1984 [GB] United Kingdom ............... 8405559

[51] Int. Cl.⁴ .............................................. B60R 21/10
[52] U.S. Cl. ................................... 297/483; 280/808
[58] Field of Search ............... 297/483, 468; 280/808, 280/801

[56] References Cited

U.S. PATENT DOCUMENTS 4,306,735 12/1981 Pfeiffer .............................. 280/808
4,351,545 9/1982 Cardew ........................... 280/808 X
4,359,237 11/1982 Gavagan ......................... 280/808 X
4,456,283 6/1984 Michael et al. .................. 297/483 X

FOREIGN PATENT DOCUMENTS 2064943 6/1981 United Kingdom ............... 280/808

Primary Examiner—James T. McCall
Attorney, Agent, or Firm—Hayes, Davis & Soloway

[57] ABSTRACT

Clamping means for a strap, comprises a guide member pivotally mounted on a base member for angular movement about a first axis, and a clamping member pivotally mounted on the base member for angular movement about a second axis parallel to the first axis and located at a greater radius from the second axis than the radius of the guide member from the first axis. Resilient means biases the guide member and the clamping member into a rest position in which the strap is freely movable between the guide member and clamping member. Coupling means are arranged so that angular movement of the guide member against the bias of the resilient means towards the plane containing the two pivot axes causes corresponding angular movement of the clamping member, thereby wrapping the strap round both the clamping member and the guide member.

8 Claims, 8 Drawing Figures

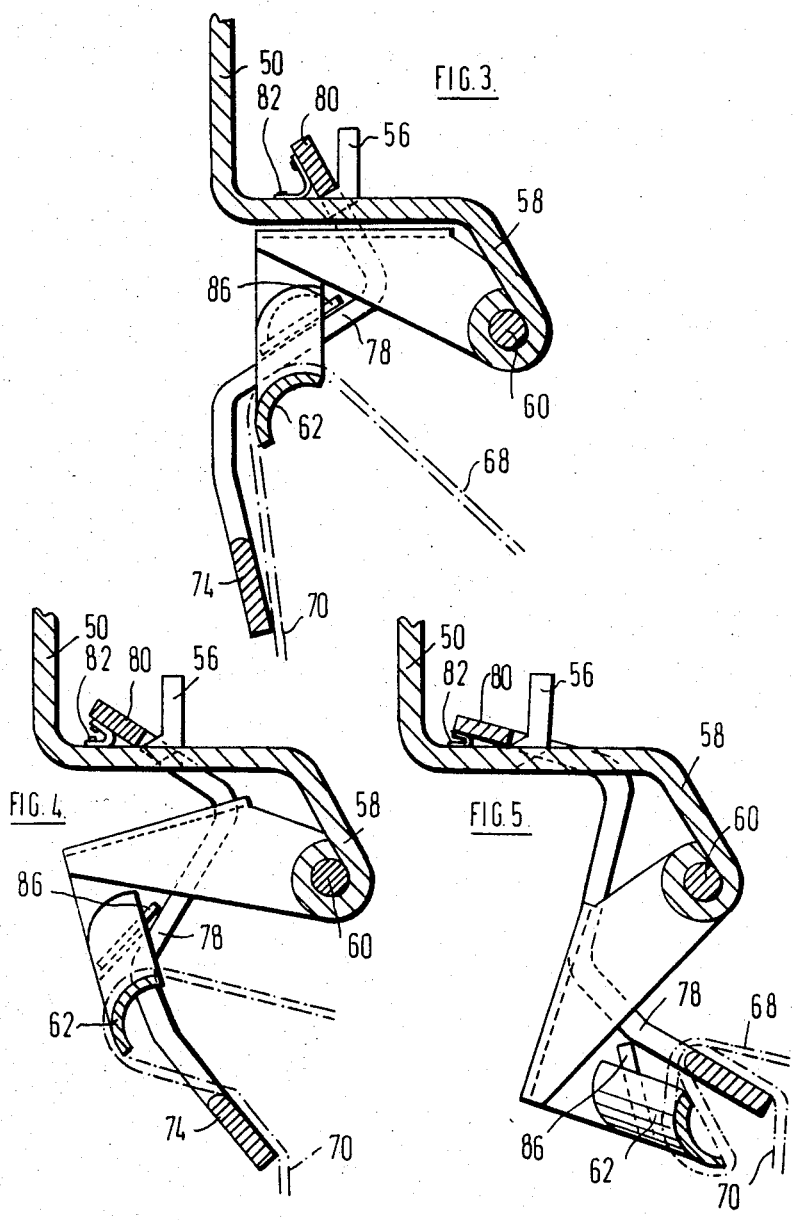

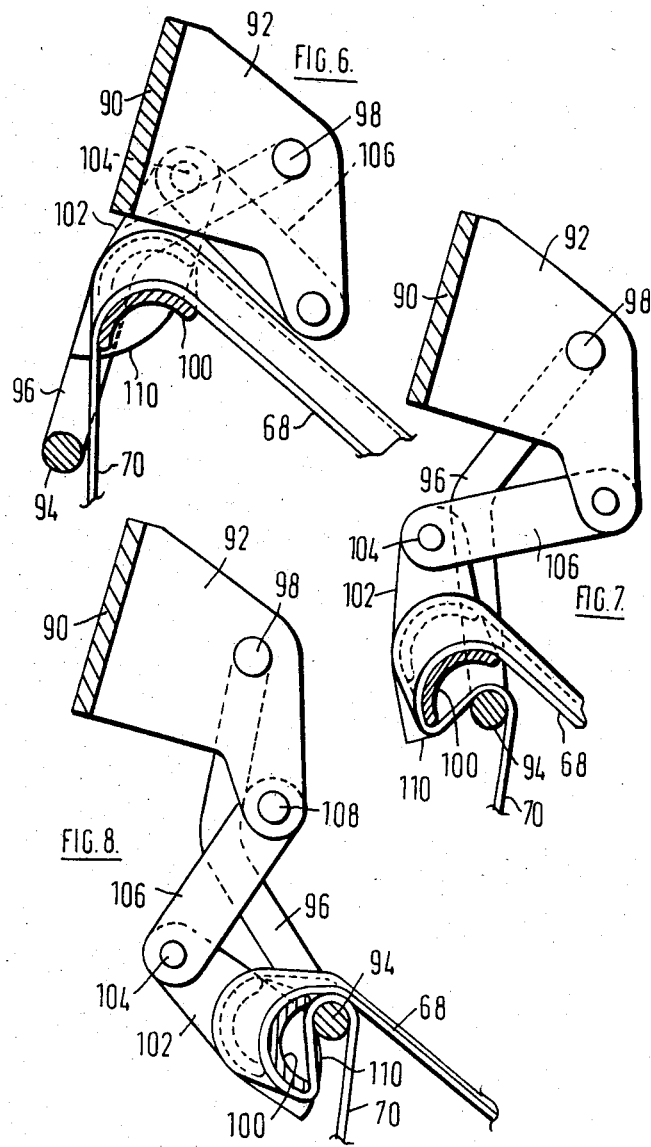

CLAMPING MEANS FOR A STRAP

This invention relates to clamping means for a strap and has particular application to the provision of clamping means for a vehicle safety belt system incorporating an emergency locking retractor.

Locking mechanisms for safety belt retractors commonly operate to lock the spindle of the retractor. With this arrangement, it is usual to find that an undesirably large length of webbing is paid out after the spindle has locked, due to tightening of the coils of webbing wound on the spindle. In addition, it is necessary for the retractor to be strong enough to take full crash load. Various proposals have been made for clamping the strap or webbing directly but these have in general been cumbersome and bulky. The present invention aims to provide clamping means of this type suitable for use at the shoulder anchorage of a vehicle safety belt system.

According to the invention, clamping means for a strap comprises a guide member pivotally mounted on a base member for angular movement about a first axis, a clamping member pivotally mounted on the base member for angular movement about a second axis parallel to the first axis and located at a greater radius from the second axis than that of the guide member from the first axis, resilient means for biasing the guide member and the clamping member into a rest position in which the strap is freely movable between the guide member and clamping member, and coupling means arranged so that angular movement of the guide member against the bias of the resilient means towards the plane containing the two pivot axes causes corresponding angular movement of the clamping member, thereby wrapping the strap round both the clamping member and the guide member.

In use, the clamping means may be mounted in a vehicle adjacent to the shoulder of the user of the safety belt. The shoulder strap of the safety belt travels over the guide member and then down past the clamping member on to an emergency locking retractor. The strength of the resilient means is arranged to be sufficient to prevent tension in the strap due to the retraction spring of the retractor causing movement of the guide member away from its rest position. However, if the retractor locks, the force exerted by the strap on the guide member causes angular movement of the latter away from its rest position and the coupling means causes movement of the clamping member in the same direction. Because of the different radii of angular movement, the clamping member moves under the guide member, wrapping the strap round the bottom of the latter and the top of itself with the result that the guide member and clamping member are firmly secured together independently of the coupling means. Further angular movement due to the pull exerted on the shoulder strap results in the path of the strap which is in contact with the clamping member coming into face-to-face engagement with the part of the strap leading from the guide member to the shoulder of the user, thereby further increasing the clamping effect. When the tension is released, the resilient means pushes the guide member and clamping member back to their rest position.

Preferably the clamping means is so arranged that, during all stages of its movement from the fully released to the fully clamped position, no webbing is drawn in by the clamping means as clamping progresses. This avoids both the imposition of excess loads on the retractor and any possibility of the retractor itself restricting movement of the clamping means to the fully clamped position. One way of achieving this result is to ensure that the clamping member and the guide member are held spaced apart from one another by a controlled distance which reduces progressively as clamping proceeds. This may be achieved by arranging for the radius of either the clamping member or the guide member from its respective pivot axis to change during angular movement thereof from the released to the clamped position.

In one form of the invention, the clamping means is pivotally mounted on the vehicle body for angular movement about a horizontal transverse axis relative to the vehicle. In use, the clamping means pivots about the horizontal transverse axis so as to take up an angle approximately bisecting the angle between the part of the strap extending towards the retractor and the part of the strap extending towards the shoulder of the user when the belt is in use, the guide member thus being parallel to the fold line of the strap. Alternatively, the clamping means may be rigidly secured to the vehicle body.

The guide member and clamping member may both be straight and disposed parallel to one another. Alternatively, the guide member and clamping member may both be of arcuate shape, of approximately the same radius and centred on a point above their two axes.

The coupling means may take the form of projections on the guide member having cam surfaces which engage with the opposite side of the clamping member to that past which the strap extends.

The clamping means may be secured to, or formed integrally with, a traveller which is slidably mounted on a vertically extending track secured to the vehicle body. Preferably the traveller carries a pivotally mounted lever having a manually operable pushbutton on one side of the pivot and a latch member on the other, the latch member being movable by means of the lever between a position of engagement with a selected one of a row of latching formations on the track and a position of disengagement therefrom.

An embodiment of the invention will now be described, by way of example, with reference to the accompanying drawings, in which:

FIG. 3 is a cross-sectional view taken on the line 3—3 in FIG. 1;

FIG. 4 is a cross-sectional view, similar to FIG. 3 but with the clamping means in an intermediate position;

FIG. 5 is a cross-sectional view taken on the line 5—5 in FIG. 2;

FIG. 6 is a cross-sectional view, similar to FIG. 3, of a shoulder anchorage for a vehicle saftey belt incorporating clamping means in accordance with a second embodiment of the invention, with the clamping means in its released position;

FIG. 7 is a cross-sectional view, of the embodiment shown in FIG. 6, with the clamping means in an intermediate position; and FIG. 8 is a cross-sectional view of the embodiment shown in FIGS. 5 and 6 but with the clamping means in its fully locked position.

Figure 1:
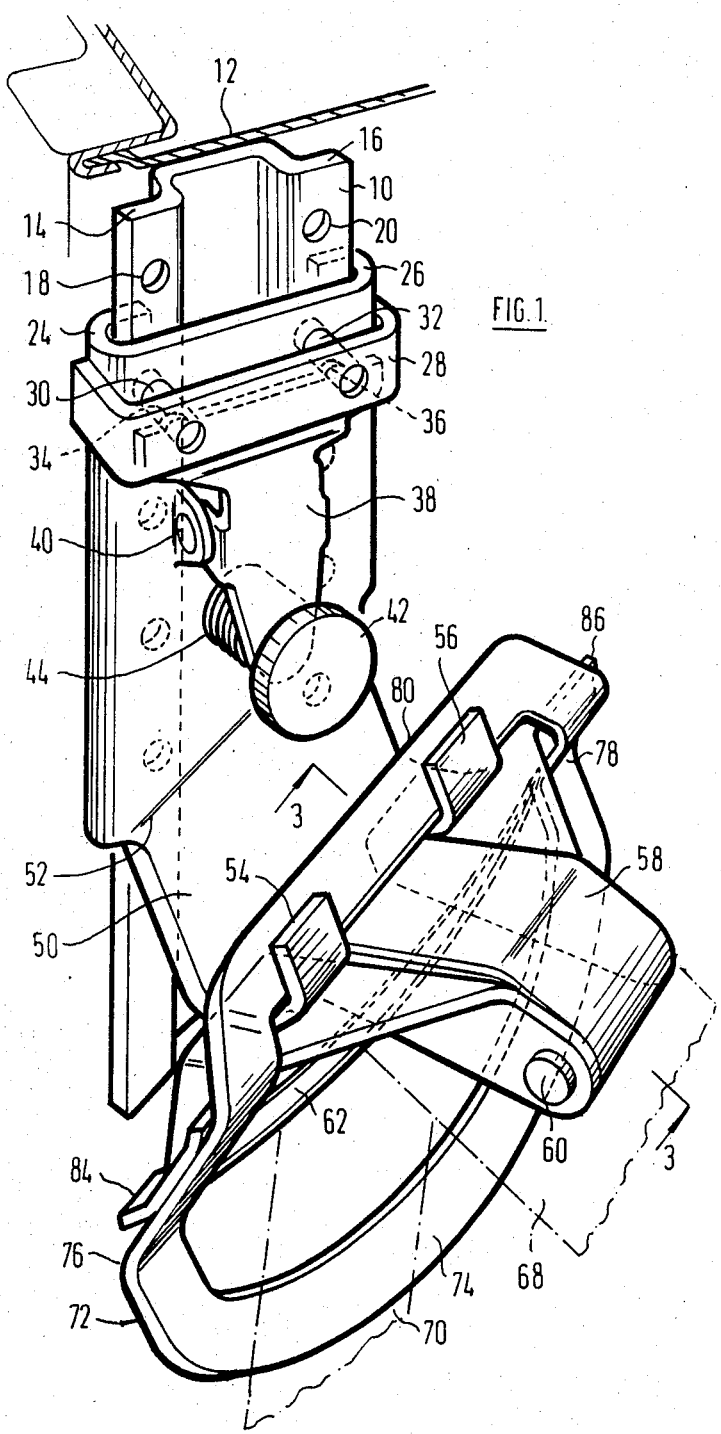
FIG. 1 is a perspective view of a shoulder anchorage for a vehicle safety belt incorporating clamping means in accordance with a first embodiment of the invention, with the belt in its position of normal use.

Referring first to FIGS. 1 to 5, a vertically extending track 10 is secured to the interior of the B-post 12 on the right-hand side of a motor vehicle. The track 10 has two side flanges 14 and 16 which are spaced from the B-post 12 and each of which contains a row of uniformly spaced holes 18, 20.

A metal plate 22 has its sides bent back on themselves so as to form two mutually confronting channel formations 24 and 26 which embrace the edges of the flanges 14 and 16 of the track so that the plate 22 is slidable therealong in the vertical direction but is held captive thereon against horizontal displacement.

A bridge member 28 is secured to the outsides of the channels 24 and 26 so as to extend across the plate 22 on the opposite side of the track 10. Two bolts 30 and 32 are mounted in respective pairs of aligned holes in the bridge member and the plate 22, for movement into and out of engagement with a selective pair of holes 18, 20 in the flanges 14 and 16 of the track 10 so as to prevent movement therealong of the plate 22. Each of the bolts 30 and 32 has a notch 34, 36 in its lower surface for receiving the edge of a lever 38 which is pivotally mounted on lugs projecting from the plate 22 by a pivot pin 40. A push button 42 is mounted on the lower end of the lever 38. A compression spring 44 engages between the plate 22 and the lever 38 behind the push button 42 so as to urge the lower end of the lever 38 outwardly and thus push the bolts 30 and 32 into engagement with the track. Assuming that the bolts 30 and 32 are aligned with one of the pairs of holes 18, 20, the plate 22 is imobilised on the track. In order to adjust its vertical position, the user merely has to depress the push button 42, thereby disengaging the bolts 30 and 32 and allowing the plate 22 to slide along the track.

Figure 2:
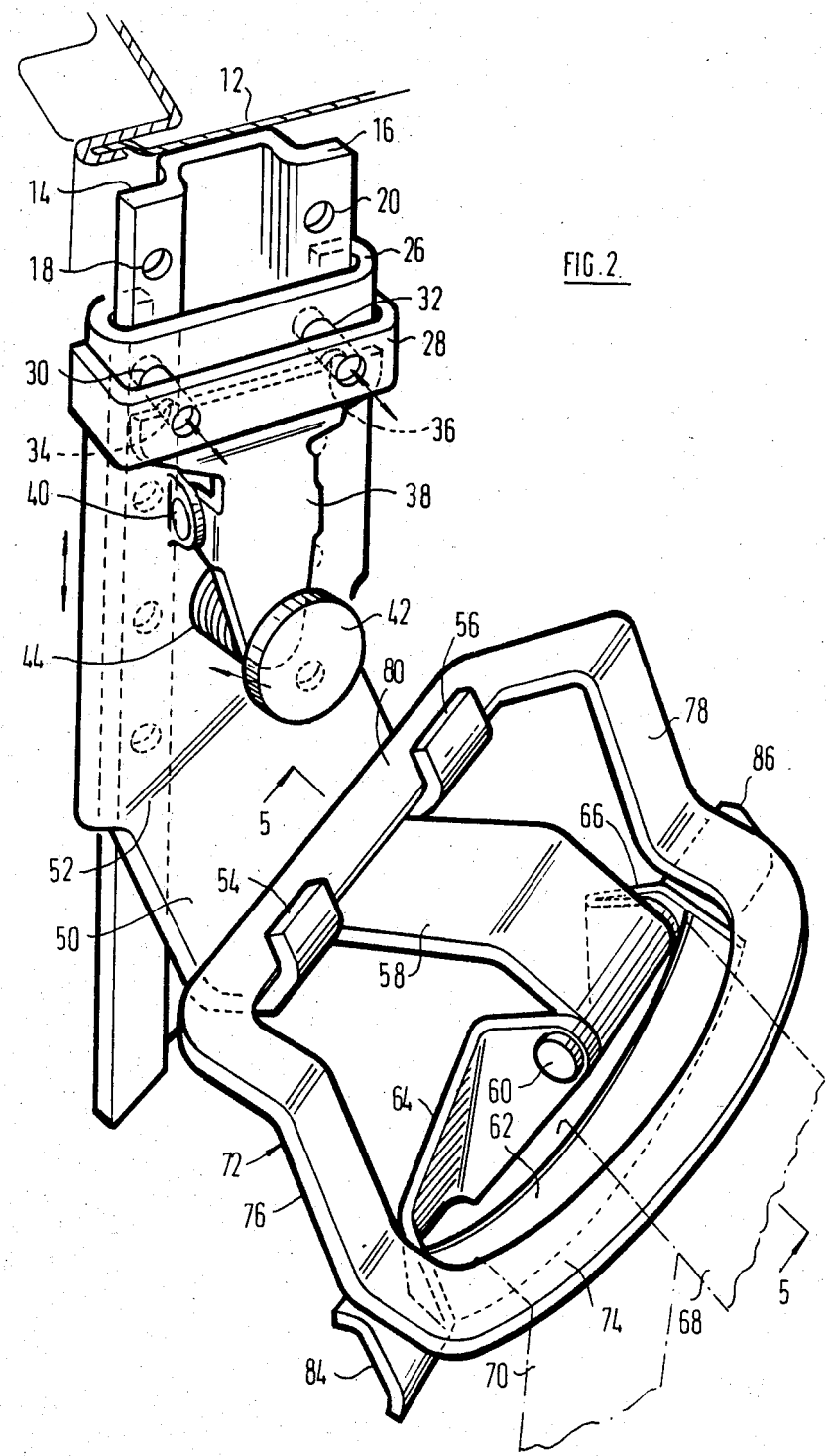
FIG. 2 is a perspective view, similar to FIG. 1, but showing the clamping means in its fully locked position.

The bottom part 50 of the plate 22 is bent outwardly along an oblique fold line 52, the direction of inclination of the fold line 52, as illustrated in FIGS. 1 and 2, being that which is appropriate for the left-hand side of a motor vehicle. The part 52 has two upturned lugs 54 and 56 forming a first pivot axis, and an outwardly projecting part 58 which carries a pivot pin 60, forming a second pivot axis on its outer end. A guide member 62 has side limbs 64 and 66 which are pivotally mounted on the pin 60. The guide member 62 is of arcuate shape, centred on a point above the bolt 18 and its upper surface is rounded across its width as can best be seen in FIG. 3. Part 68 of the shoulder strap of a vehicle safety belt extends from the user's shoulder to the guide member 62 and another part 70 thereof extends downwardly to an emergency locking retractor (not shown).

An annular clamping member 72 has an arcuate clamping portion 74, of somewhat larger radius than the guide member 62, which is connected by side limbs 76 and 78 to a straight portion 80 which rests in the lugs 54 and 56. A spring 82 biases the clamping member 72 in the anti-clockwise direction as viewed in FIG. 3. The guide member 62 has a respective cam projection 84, 86 on each end. Each such cam projection engages with a respective side limb 76, 78 of the clamping member 74, with the result that the spring 82 also biases the guide member 62 in the anti-clockwise direction as viewed in FIG. 3. In this position, the clamping member 72 may touch the part 70 of the strap but does not significantly affect the frictional resistance to the strap passing round the guide member 62.

In use, provided that the tension in the two strap parts 68 and 70 is insufficient to overcome the spring 82, the strap can pass freely over the guide member 62. However, if the tension in the strap increases to such an extent that it moves the guide member 62 in an anti-clockwise direction, as viewed in FIG. 3, the engagement between the cam projections 84 and 86 on the one hand and the clamping member 72 on the other causes the latter to move in an anti-clockwise direction, lifting the part 70 of the strap towards the part 68, as shown in FIG. 4.

Continued tension moves the guide means 62 and the clamping means 72 to a position in which there is face-to-face engagement between the parts 68 and 70 of the strap with the result that the clamping member 72 is held closely adjacent to the guide member 62. Further tension in the part 68 of the strap causes the mechanism to take up the position illustrated in FIG. 5 in which the strap is firmly locked. The mechanism remains in this condition until the tension in the part 68 of the strap relaxes sufficiently for the combined effects of gravity and the spring 82 to restore it to the position illustrated in FIG. 3 whereupon the strap is once again freely movable round the guide member 62.

With the embodiment illustrated in FIGS. 1 to 5, the safety belt strap is paid out during the early stages of movement from the release position illustrated in FIG. 3 to the fully clamped position illustrated in FIG. 5, due to the downward movement of the guide member 62 and clamping member 70. However, if the geometry of a particular installation was such as to involve further upward movement of the clamping member 72, such upward movement would be resisted by tension in the part 70 of the strap. Although the part 70 can stretch and webbing can be compacted on the retractor spool, the result is to impose an unnecessary load on the retractor and its mountings. FIGS. 6 to 8 illustrate clamping means which is not subject to this disadvantage.

The shoulder anchorage illustrated in FIG. 6 comprises a U-shaped frame 90 which is intended to be bolted directly on to the B-post (not shown) of a motor vehicle. The frame 90 has side limbs 92 and a clamping member 94, the side limbs 96 of which carry respective pivot pins 98 which engage in the side limbs 92 of the frame 90.

A guide member 100 is mounted on side limbs 102, each of which is pivotally connected, at 104 to a respective link 106. Each of the links 106 carries a respective pin 108 which engages in a corresponding side limb 92 of the U-shaped frame 90. A spring (not shown) biases the links 106 in the anti-clockwise direction, as viewed in FIG. 6. As with the embodiment illustrated in FIGS. 1 to 5, part 68 of the shoulder strap of a vehicle safety belt extends from the user's shoulder to the guide member 100 and another part 70 thereof extends downwardly to an emergency locking retractor (not shown).

The side limbs 102 which support the guide member 100 have projections carrying respective camming surfaces 110 which come into engagement with the clamping member 94, as will be explained hereinafter.

In use, provided that the tension in the two strap parts 68 and 70 is insufficient to overcome the biasing spring (not shown) for the links 106, the strap can pass freely over the guide member 100. However, if the tension in the strap increases to such an extent that it moves the guide member 100 downwardly, the camming surfaces 110 come into engagement with the clamping member 94.

Continued tension moves the clamping member 94 over the camming surfaces 110 to the position shown in FIG. 7 and then to the position shown in FIG. 8. It will be observed that the length of strap wound round the clamping member 94 and the guide member 100 is less in the fully clamped position illustrated in FIG. 7 than in the intermediate position illustrated in FIG. 6. Consequently no extra load is imposed on the part 100 of the strap during the final stages of movement to the fully clamped position.

When the tension in the strap 98 is released, the spring (not shown) associated with the links 106 restores the clamping means to its released position illustrated in FIG. 6.

Clamping means of the type illustrated in FIGS. 6 to 8 may be mounted on height adjustment means as illustrated in FIGS. 1 and 2. Similarly, clamping means of the type illustrated in FIGS. 1 to 5 may be adapted to be bolted directly on to a B-post of a motor vehicle.

I claim:

1. Clamping means for a strap, comprising a base member, a guide member pivotally mounted on the base member for angular movement about a first axis, a clamping member pivotally mounted on the base member for angular movement about a second axis parallel to the first axis and located at a greater radius from the second axis than the radius of the guide member from the first axis, resilient means for biasing the guide member and the clamping member into a rest position in which the strap is freely movable between the guide member and clamping member, and coupling means arranged so that angular movement of the guide member against the bias of the resilient means towards the plane containing the two pivot axes causes corresponding angular movement of the clamping member, thereby wrapping the strap round both the clamping member and the guide member.

2. Clamping means according to claim 1, wherein the clamping member and the guide member are held spaced apart from one another by a controlled distance which reduces progressively as clamping proceeds.

3. Clamping means according to claim 2, wherein one of the radius of the guide member from the first pivot axis and the radius of the clamping member from the second pivot axis is arranged to change during angular movement thereof from the released to the clamped position.

4. Clamping means according to claim 1, wherein the base member is adapted to be pivotally mounted on a fixed structure for angular movement about a horizontal transverse axis relative to said fixed structure.

5. Clamping means according to claim 1, wherein the guide member and clamping member are both of arcuate shape, of approximately the same radius and centred on a point above their two axes.

6. Clamping means according to claim 1, wherein the coupling means comprise projections on the guide member having cam surfaces which engage with the opposite side of the clamping member to that past which the strap extends.

7. Clamping means according to claim 1, wherein the base member is located on a traveller which is slidably mounted on a vertically extending track.

8. Clamping means according to claim 7, wherein the traveller carries a pivotally mounted lever having a manually operable pushbutton on one side of the pivot and a latch member on the other, the latch member being movable by means of the lever between a position of engagement with a selected one of a row of latching formations on the track and a position of disengagement therefrom.

* * * * *